Aug. 7, 1951 J. P. EUGLEY ET AL 2,563,106

COINCIDENCE INDICATOR FOR ELECTRONIC COUNTERS

Filed April 28, 1948

INVENTOR
Jenness P. Eugley &
Robert R. Freas, Jr.
BY Morris Rabin
ATTORNEY

Patented Aug. 7, 1951 2,563,106

UNITED STATES PATENT OFFICE 2,563,106

COINCIDENCE INDICATOR FOR ELECTRONIC COUNTERS

Jenness P. Eugley, Runnemede, N. J., and Robert R. Freas, Jr., Jermyn, Pa., assignors to Radio Corporation of America, a corporation of Delaware Application April 28, 1948, Serial No. 23,816

2 Claims. (Cl. 235—92)

Figures 1, 2:
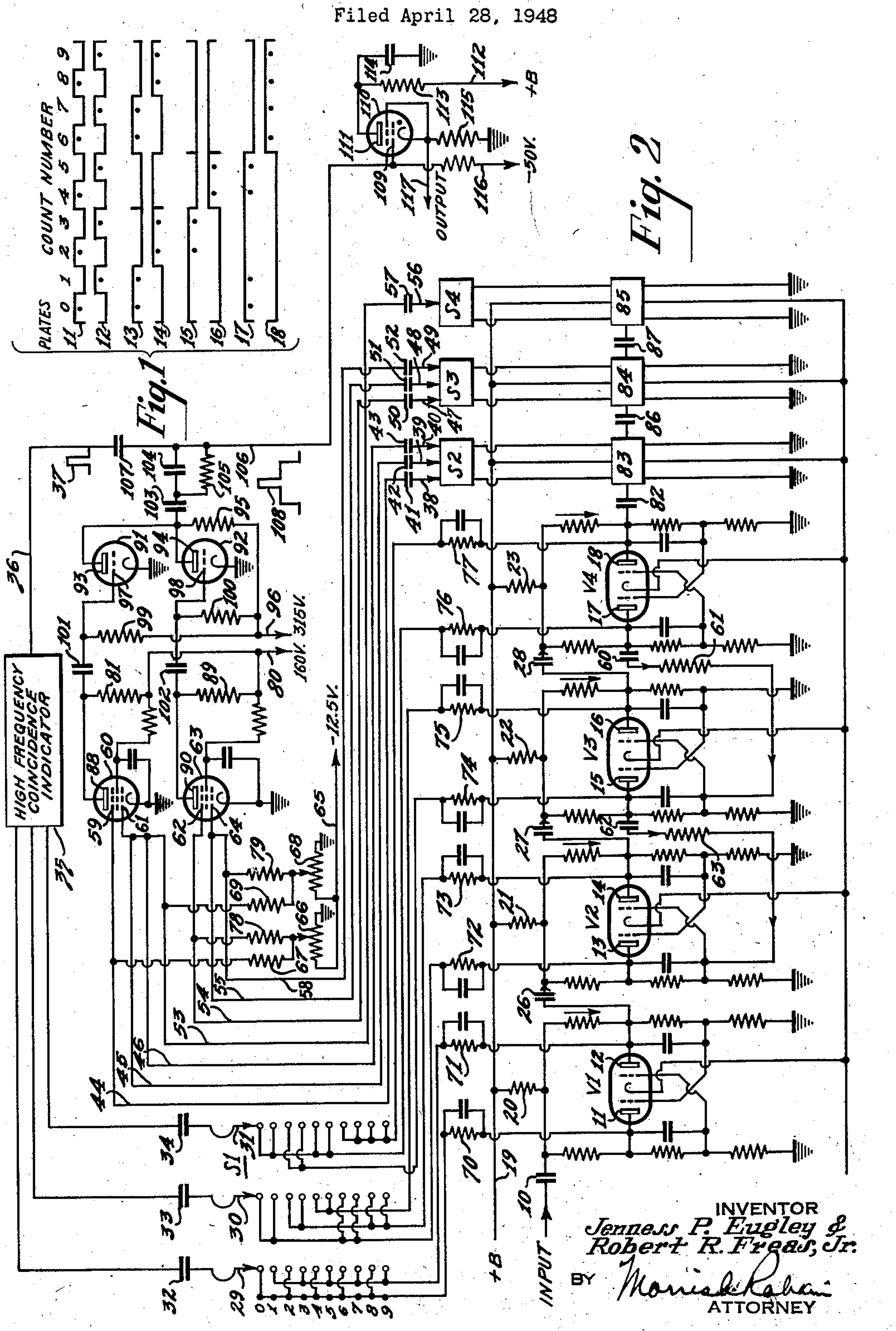

This invention relates to coincidence indicators for electronic counters including a plurality of tandem connected trigger circuits of the type wherein a pair of triodes (1) have operating potential applied to their anodes through a common resistor and thence through separate resistors, (2) have their anodes each cross-connected to the grid of the other through a resistor which is shunted by a capacitor, (3) have their grids grounded through separate resistors, and (4) have their cathodes connected to a lead maintained at a suitable negative potential.

As is well known, with such connections, current conduction is stable in one or the other anode of each trigger circuit and is transferred from one anode to the other in response to the application of a negative pulse at the junction between the common and separate anode resistors.

It is also well understood that in the operation of such a counter, input pulses are applied to the common anode resistor terminal of the trigger circuit or counter stage which operates at the highest frequency and that each of the succeeding counter stages has its common anode resistor terminal coupled to that anode of the immediately preceding stage which conducts current when such preceding stage is in a binary 0 condition. Thus for every two pulses fed to the first counter state, one square wave is produced at the anodes of the first stage, for every four pulses fed to the first counter stage, one square wave is produced at the anodes of the second stage, etc.

It is well known that each group of four trigger circuits of the counter may be provided with feedback connections (1) between the binary 1 anode of the third trigger circuit and the binary 0 grid of the second trigger circuit and (2) between the binary 1 anode of the fourth trigger circuit and the binary 0 grid of the third trigger circuit so that each group of four trigger circuits completes its cycle of operation in response to the application of ten pulses to the common anode resistor terminal of the lowest order or highest frequency trigger circuit. Such a group of trigger circuits is hereinafter called a decade and each trigger circuit of the counter is hereinafter called a stage.

The counter to which the improved coincidence indicator of the present invention is applied includes three decades and the output lead of the highest order or lowest frequency decade is coupled to the common anode resistor terminal of the first of a group of two trigger circuits which function like a binary counter.

As disclosed in a copending application of W. H. Bliss, Serial No. 736,214, filed March 21, 1947, now Patent No. 2,521,774 issued September 12, 1950 each of the three decades and the binary counter have their anodes connected to the fixed contacts of a different count selector switch. The fixed contacts of these switches are so arranged that any count from 0 to 9 of a decade or either the 0 or 1 count of the binary counter may be selected by moving switch output contacts into engagement with the different fixed contacts.

The coincidence indicator of the present invention has its input leads connected to the selector switch output contacts and functions to deliver one output pulse in response to the count selected by these switches. With the illustrated form of the invention, the count thus selected may be anything from 0 to 2000. If the input pulses have a frequency of 100 kc., it is apparent that the selector switches are operable to produce between the first input pulse and the output pulse a time delay which may be varied in 10 microsecond steps and may be anything from 0 to 20,000 microseconds.

The coincidence indicator of the present invention includes (1) a high frequency coincidence indicating circuit which has its input leads connected to the output contacts of the selector switch of the first decade and delivers one output pulse in response to the selected count of the first decade, (2) a pair of pentodes which have their first and third grids connected to the output contacts of the selector switches of the second and third decades and the binary counter and (3) an output combining circuit which functions to deliver an output pulse in response to the count selected by the various switches. This coincidence indicator has the advantage that it requires a minimum of tubes and functions in response of the selected count of the second and third decades and the binary counter to produce a single voltage pedestal on which is superimposed the output voltage of the high frequency coincidence indicator. This two level voltage is utilized to fire a gaseous conduction device or thyratron which has in its cathode lead a resistor from the high voltage terminal of which an output pulse of high amplitude is derived.

The principal object of the invention is the provision of an improved coincidence indicator and method of operation which involve a minimum of parts. An additional object is to provide a coincidence indicator which avoids the production of control voltages having a different level for each of the decades and the binary counter.

The invention will be better understood from the following description considered in connection with the accompanying drawings and its scope is indicated by the appended claims.

Referring to the drawings:

Figure 1 is an explanatory diagram wherein the trigger circuit anodes selected for the different counts of the first decade are indicated by dots, and Figure 2 illustrates the connections of the improved coincidence indicator.

The counter of Figure 2 includes a first decade V1 to V4 which has a count selector switch S1, a second decade 83 which has a count selector switch S2, a third decade 84 which has a count selector switch S3 and a two stage section 85 which has a count selector switch S4.

Input pulses are applied to the first stage V1 through a capacitor 10. Each ten input pulses cause one pulse to be applied through a capacitor 82 to the input of the decade 83, each one hundred input pulses causes one pulse to be applied through a capacitor 86 to the input of the decade 84 and each one thousand input pulses causes one pulse to be applied through a capacitor 87 to the input of the two stage section 85. Otherwise stated, the counting range of each of the decades is ten, the counting range of the two stage section is two and the counting range of the counter is two thousand. Any count of the units is selected by the switch S1, any count of the tens is selected by the switch S2, any count of the hundreds is selected by the switch S3 and either count of one or two thousand is selected by the switch S4.

The detailed connections of the decade V1 to V4 and its selector switch S1 appear in Figure 2. The connections of the decades 83 and 84 are like that of the stage V1 to V4 and have been shown in the form of boxes. The two stage section 85 and its count selector switch S4 involve no unobvious connections and have been shown in the form of boxes.

It will be noted that the decade V1 to V4 has operating potential applied from a +B lead 19 to its successive stages through common anode resistors 20 to 23 and that the other connections of each of these stages are as explained above. In the binary 0 condition of these stages, current conduction is in the anodes 12, 14, 16 and 18 as indicated by the arrows adjacent the separate or individual anode resistors. In the binary 1 condition of the stages, current conduction is in the anodes 11, 13, 15 and 17.

The stages are connected in tandem through the medium of coupling capacitors 26, 27 and 28, the binary 1 anode 15 of the stage V3 is coupled to the binary 0 grid of the stage V2 through a capacitor 62 and a resistor 63, and the binary 1 anode 17 of the stage V4 is coupled to the binary 0 grid of the stage V3 through a capacitor 60 and a resistor 61.

With the connections of the decade V1 to V4 as indicated, the square wave form voltages appearing at the anodes 11 to 18 are as indicated in Figure 1. In this figure, the count of the decade V1 to V4 is indicated by the numerals 0 to 9 at the top of the figure and the particular anode voltages selected by the switch S1 for the various counts are indicated by dots. Such selected counts are indicated by the numerals 0 to 9 appearing at the left of the horizontal rows of fixed contacts of the switch S1 of Figure 2. For example, if a count of 4 is to be selected, the switch output contacts 29, 30 and 31 are moved to the "4" position and the voltages of the anodes 11, 16 and 17, which have the maximum voltage simultaneously only for the count of 4, are selected. The voltages of other anodes having their maximum voltage simultaneously only for the selected count are applied to the switch output contacts 29, 30 and 31 in a similar way.

Counter loading limitations make it desirable that the anode voltages be applied to the fixed contacts of the selector switches through isolating impedance elements such as the resistors 70 to 77 which are each shunted by a capacitor.

The anode voltages selected by the switch output contacts 29, 30 and 31 are coupled through capacitors 32, 33 and 34 to the input leads of a high frequency coincidence indicator 35. When the decade V1 to V4 attains the count selected by the contacts 29, 30 and 31, there appears at the output lead 36 a voltage pulse of a form somewhat like that indicated at 37.

The selector switch S2 has output contacts 38, 39 and 40 which are connected through capacitors 41, 42 and 43 to leads 44, 45 and 46. Similarly the selector switch S3 has output contacts 47, 48 and 49 which are connected through capacitors 50, 51 and 52 to leads 53, 54 and 55. The switch S4 has an output contact 56 which is connected through a capacitor 57 to a lead 58.

It will be noted that (1) the lead 44 is connected to the grid 59 of a multigrid tube such as pentode 60, (2) the leads 45, 46 and 53 are connected to the grid 61 of the pentode 60, (3) the lead 54 is connected to the grid 62 of another multigrid tube such as pentode 63 and (4) the leads 55 and 58 are connected to the grid 64 of the pentode 63.

From a 12.5 volt lead 65 bias potential is applied (1) through resistors 66 and 67 to the grid 59, (2) through resistors 68 and 69 to the grid 61, (3) through resistors 66 and 78 to the grid 62, and (4) through the resistors 68 and 79 to the grid 64. These various bias potentials are made such that the pentodes 60 and 63 conduct current only when all the switch output contacts to which their grids are connected have their maximum voltages. Thus the pentodes 60 and 63 simultaneously conduct current only in response to the count selected by the switches S2, S3 and S4.

Operating potential is applied from a 160 volt lead 80 through a resistor 81 to the anode 88 of the pentode 60 and through a resistor 89 to the anode 90 of the pentode 63.

A pair of triodes 91 and 92 have their anodes 93 and 94 connected through a common resistor 95 to a 315V lead 96 and have their grids 97 and 98 connected to the lead 96 through the resistors 99 and 100. With these connections, the triodes 91 and 92 are normally conducting current through the resistor 95, the grids 97 and 98 are biased to zero, and the voltage drop of the resistor 95 is substantially constant. This voltage drop of the resistor 95 is maintained so long as the grids 97 and 98 are not biased to cutoff simultaneously.

The grids 97 and 98 are connected through the capacitors 101 and 102 to the anodes 88 and 90 of the pentodes 60 and 63. When these pentodes conduct current simultaneously, both the grids 97 and 98 are biased to cutoff, the current through the resistor 95 is interrupted and a positive pulse is applied through a capacitor 103 and an isolating impedance element 104—105 to the lead 106.

Since the lead 106 is connected to the lead 36 through a capacitor 107, the high frequency pulse 37 is combined with the pulse applied from the resistor 95 to form a two level voltage pulse something like that indicated at 108. Obviously the pulse 108 attains its maximum amplitude only in response to the count selected by the selector switches S1, S2, S3 and S4.

The pulse 108 is applied to the grid 109 of a thyratron 110 which has operating potential applied to its anode 111 from a lead 112 through resistor 113, has its anode 111 connected to ground through a bypass capacitor 114, has a resistor 115 in its cathode lead, and has its grid 109 so biased through a 50 volt lead 116 that it conducts current only when the pulse 108 has its maximum amplitude.

When the thyratron 110 conducts current a positive output pulse of high amplitude is produced at the lead 117. Obviously such output pulse may be applied to the binary 0 grids of the different counter stages for resetting the counter to its zero condition or may be otherwise utilized.

What the invention provides is a coincidence indicator which (1) includes a minimum of component parts, (2) involves the production of a control pulse having only two voltage leads, and (3) is operable to select any count between 0 and 2000. It is apparent that the illustrated form of the invention may be extended to include additional decades or counter sections which have the output contacts of their selector switches suitably connected to the grids of the pentodes 60 and 63.

We claim as our invention:

1. In a coincidence indicator for producing an output pulse in response to different counts of a counter wherein a plurality of stages are connected in tandem and are arranged in groups each having a selector switch to the output contacts of which maximum voltages are applied only in response to the selected count of that group and wherein the lowest order of said groups is followed by a plurality of higher order groups, the combination of a pair of multigrid electron discharge tubes having their grids connected to the output contacts of all of said selector switches except that of the lowest order of said groups so that said multigrid electron discharge tubes conduct current only in response to the maximum potentials of all the switch output contacts to which their grids are connected, means responsive only to simultaneous conduction of current by both of said multigrid electron discharge tubes for producing a first voltage pulse, means for producing a second voltage pulse only in response to the maximum voltages of the output contacts of the selector switch of the lowest order of said groups, and means for superimposing said second voltage pulse on said first voltage pulse to form a two level control pulse.

2. In a coincidence indicator for producing an output pulse in response to different counts of a counter wherein a plurality of stages are connected in tandem and are arranged in groups each having a selector switch to the output contacts of which maximum voltages are applied only in response to the selected count of that group and wherein the lowest order of said groups is followed by a plurality of higher order groups, the combination of a pair of multigrid electron discharge tubes having their grids connected to the output contacts of all of said selector switches except that of the lowest order of said groups so that said multigrid electron discharge tubes conduct current only in response to the maximum potentials of all the switch output contacts to which their grids are connected, a resistor, means including a second pair of electron discharge tubes interconnected to conduct current through said resistor only when said multigrid electron discharge tubes are not conducting current simultaneously, and means for deriving a first voltage pulse from said resistor in response to interruption of the currents of said second pair of electron discharge tubes, means for producing a second voltage pulse only in response to the maximum voltages of the output contacts of the selector switch of the lowest order of said groups, and means for superimposing said second voltage pulse on said first voltage pulse to form a two level control pulse.

JENNESS P. EUGLEY.
ROBERT R. FREAS, JR.

REFERENCES CITED

The following references are of record in the file of this patent:

UNITED STATES PATENTS

| Number | Name | Date |
|---|---|---|
| 2,422,698 | Miller | June 24, 1947 |

OTHER REFERENCES

Electronic Industries for July 1945, pages 97, 98, 99, 130, 134, 138, 143 and 146.

Electronics for March 1947, pages 120, 121, 122 and 123.

Electronics for February 1948, pages 88–93.